United States Patent
Yamanaka et al.

(10) Patent No.: US 6,493,182 B1
(45) Date of Patent: Dec. 10, 2002

(54) MAGNETIC HEAD

(75) Inventors: Noboru Yamanaka; Shigeki Tanemura, both of Saku; Akinori Koyama, Nagano; Keiji Koga, Saku, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/165,158

(22) Filed: Oct. 2, 1998

(30) Foreign Application Priority Data

Oct. 8, 1997  (JP) ............................................. 9-276291

(51) Int. Cl.[7] .......................... G11B 5/187; G11B 5/60; G11B 15/64; G11B 17/32; G11B 21/20
(52) U.S. Cl. ..................................... 360/122; 360/235.2
(58) Field of Search ................................. 360/103, 122, 360/317, 235.1, 235.2, FOR 203

(56) References Cited

U.S. PATENT DOCUMENTS

| | | | | |
|---|---|---|---|---|
| 4,023,208 A | * | 5/1977 | Feit et al. .................... | 360/122 |
| 4,897,747 A | * | 1/1990 | Meunier et al. ............. | 360/122 |
| 5,079,657 A | * | 1/1992 | Aronoff et al. ............ | 360/236.6 |
| 5,198,934 A | * | 3/1993 | Kubo et al. .................. | 360/122 |
| 5,345,353 A | * | 9/1994 | Krantz et al. ............. | 360/236.6 |
| 5,454,158 A | * | 10/1995 | Fontana et al. ........... | 29/603.07 |
| 5,555,147 A | * | 9/1996 | Maruyama ................... | 360/317 |
| 5,636,092 A | * | 6/1997 | Nasu et al. .................. | 360/122 |
| 5,710,683 A | * | 1/1998 | Sundaram .................... | 360/126 |
| 5,768,055 A | * | 6/1998 | Tian et al. ................ | 360/235.2 |
| 5,777,824 A | * | 7/1998 | Gray ........................ | 360/234.8 |
| 5,793,578 A | * | 8/1998 | Heim et al. ................. | 360/126 |
| 5,930,077 A | * | 7/1999 | Obata et al. ............. | 360/235.1 |
| 6,072,663 A | * | 6/2000 | Yokohata et al. ........ | 360/235.5 |

FOREIGN PATENT DOCUMENTS

| | | |
|---|---|---|
| EP | 000605984 A2 * | 7/1994 |
| JP | 58-21329 | 4/1983 |
| JP | 58-28650 | 6/1983 |
| JP | 63-37874 | 2/1988 |
| JP | 405128467 A * | 5/1993 |
| JP | 405314451 A * | 11/1993 |
| JP | 406012615 A * | 1/1994 |
| JP | 7-326150 | 12/1995 |
| JP | 8-212740 | 8/1996 |
| JP | 8-287440 | 11/1996 |

* cited by examiner

Primary Examiner—Robert S. Tupper
Assistant Examiner—Julie Anne Watko (57) ABSTRACT

A slider is provided with air bearing surfaces. Each of the air bearing surfaces are constituted of a protective film and slider base body surfaces. The protective films, which are laminated on part of the slide base body surfaces, cover at least the ends of the electromagnetic transducers.

38 Claims, 5 Drawing Sheets

MAGNETIC HEAD

BACKGROUND OF THE INVENTION

1. Field of the Invention

The present invention relates to a magnetic head and more particularly it relates to a magnetic head with which the adhesion phenomenon does not readily occur.

2. Discussion of Background

Magnetic heads in the known art that fly while maintaining a minute distance from the magnetic recording medium by using the dynamic pressure that is generated as the magnetic recording medium travels include, for instance, the magnetic head disclosed in Japanese Examined Patent Publication No. 21329/1983 and the magnetic head in Japanese Examined Patent Publication No. 28650/1983.

Each of the magnetic heads mentioned above that is mounted at the front end of a head support device in a magnetic recording/reproduction apparatus, is driven through the so-called contact start-stop method whereby an operation is started or stopped in a state in which the air bearing surface (hereafter referred to as the ABS) of the slider is placed in spring contact with a front surface of the magnetic disk. While the ABS is pressed against the surface of the magnetic disk due to the spring pressure when the magnetic disk is stationary, a lift dynamic pressure is generated at the ABS of the slider when the magnetic disk rotates so that the magnetic head flies above the surface of the magnetic disk.

In this type of magnetic recording/reproduction apparatus, it is desirable that the flying height of the magnetic head be set at the smallest possible value in order to support high density recording. However, when the flying height of the magnetic head is reduced, the magnetic head tends to collide with the surface of the magnetic head which may result in damage such as a crash.

One means for improving the durability by preventing such a crash is achieved by using a magnetic disk having a high degree of surface smoothness. However, since a lubricant is applied to the surface of the magnetic disk having a high degree of surface smoothness under normal circumstances, the magnetic head becomes adhered to the surface of the magnetic disk with the lubricant acting as the main cause. Furthermore, due to factors such as moisture, water or the like present in the air in addition to the adhering effect of the lubricant, the magnetic head adheres to the surface of the magnetic head with even more force.

Since this type of magnetic recording/reproduction apparatus is driven through the contact start-stop method as described earlier, it cannot be started if such adhesion of the magnetic head occurs.

Various technologies have been proposed in the prior art to constitute means for preventing the adhesion phenomenon. For instance, Japanese Unexamined Patent Publication No. 37874/1988, Japanese Unexamined Patent Publication No. 287440/1996 and Japanese Unexamined Patent Publication No. 2122740/1996 disclose means for reducing the size of the area over which the magnetic disk and the magnetic head come into contact with each other by providing three projections at specific positions at the rail surface. In addition, Japanese Unexamined Patent Publication No. 326150/1995 discloses a means for preventing adhesion by providing minute indentations and projections at the rail surface constituting a portion of the slider base body.

Now, when providing a means for adhesion prevention at the ABS of the slider, it is crucial that it cause little or no change in the flying characteristics achieved through the ABS and that the means for adhesion prevention be provided at the ABS with ease and a high degree of accuracy. The prior art technologies mentioned above do not always satisfy these requirements.

SUMMARY OF THE INVENTION

It is an object of the present invention to provide a magnetic head with which the force with which it adheres to the magnetic disk can be reduced.

It is a further object of the present invention to provide a magnetic head provided with a means for adhesion prevention capable of easily controlling the force of adhesion.

It is a still further object of the present invention to provide a magnetic head provided with a means for adhesion prevention capable of minimizing changes in the flying characteristics achieved through the ABS.

It is a still further object of the present invention to provide a magnetic head with which a means for adhesion prevention can be easily and precisely provided at the ABS.

In order to achieve the objects described above, the magnetic head according to the present invention includes a slider and an electromagnetic transducer. The slider is provided with an ABS. The electromagnetic transducer is provided at the slider and its end for electromagnetic conversion is located at a position close to the ABS. The ABS is constituted of a surface of a protective film and a slider base body surface. The protective film, which is laminated. on part of the slider base body surface covers, at least, the end of the electromagnetic transducer.

In the magnetic head according to the present invention, since the protective film is laminated onto the slider base body surface to constitute the ABS, a magnetic head achieving a high degree of frictional resistance is obtained.

In addition, since the protective film covers at least the end of the electromagnetic transducer where electromagnetic conversion is performed, the electromagnetic transducer is protected by the protective film. In particular, when the electromagnetic transducer includes a magnetoresistive element (hereafter referred to as an MR element) which constitutes a read element, the end of the MR element does not come in direct contact with the surface of the magnetic disk so that any leakage and discharge of the sense current to the magnetic disk, or any defective operation resulting from such leakage or discharge can be prevented with a high degree of reliability.

Furthermore, since the protective film is laminated on part of the slider base body surface, a stage corresponding to the film thickness of the protective film is created around the protective film relative to the slider base body surface. In this structure, the surface of the protective film and the slider base body surface constitute the ABS. Thus, the force with which the magnetic head adheres to the magnetic disk can be reduced. In addition, the force with. which the magnetic head adheres to the magnetic disk can be controlled by adjusting the size of the area of the protective film.

Moreover, the protective film which is laminated on part of the slider base body surface, is formed to have various patterns. When patterning a protective film, the required protective film pattern can be formed easily and with a high degree of accuracy by providing the protective film at the slider base body surface and .partially removing the protective film using a pattern that is set in advance through a means such as ion milling.

The present invention further discloses specific desirable examples of the protective film, the thickness of the protective film that minimizes any changes in the flying characteristics, the relationship between the adhesive force and the area of the protective film and the like.

BRIEF DESCRIPTION OF THE DRAWINGS

Other objects, structural features and advantages of the present invention are explained in further detail by referring to the attached drawings. It is to be noted that the drawings are presented simply to illustrate the preferred embodiments.

DETAILED DESCRIPTION OF THE PREFERRED EMBODIMENTS

Figure 1:
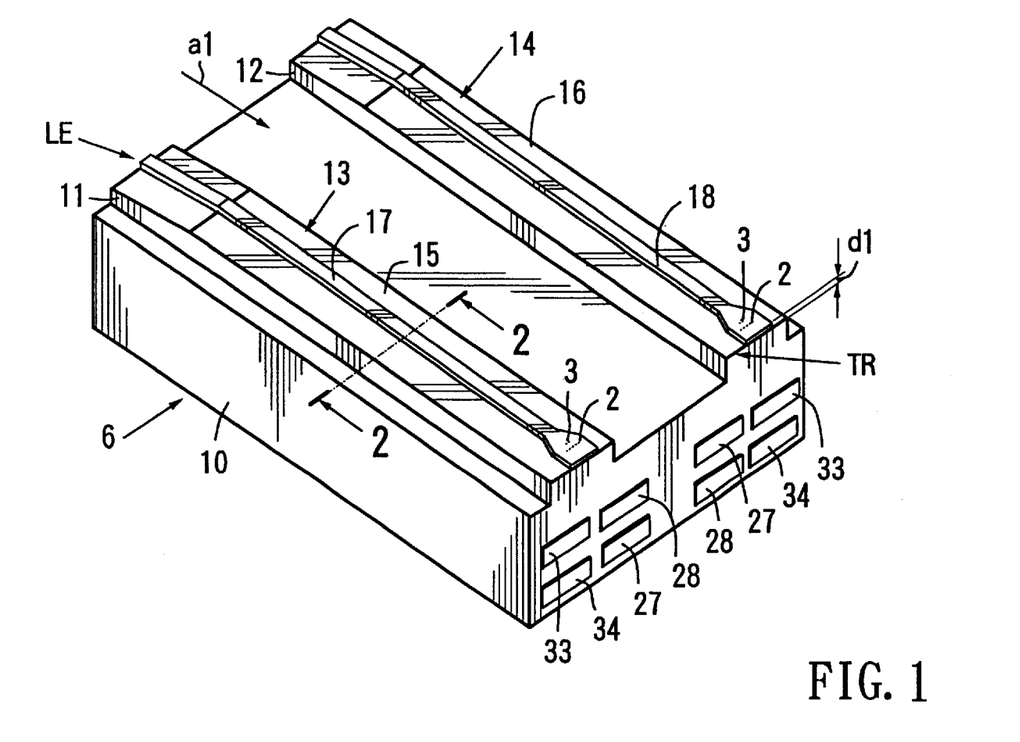
FIG. 1 is a perspective of the magnetic head according to the present invention.
Figure 2:
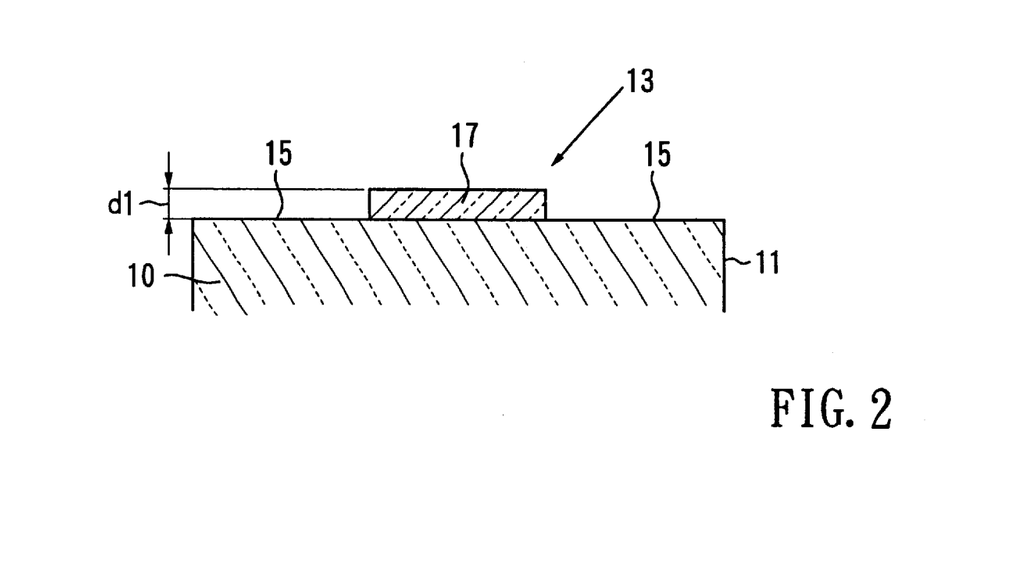
FIG. 2 is a partial sectional view taken along line 2—2 of FIG. 1.

Referring to FIGS. 1 and 2, the thin film magnetic head 6 includes a slider 10 and electromagnetic transducers 2 and 3. The electromagnetic transducer 2, which is an inductive electromagnetic transducer, constitutes a write element. The electromagnetic transducer 3 is a read element constituted of an magnetoresistive or MR element. The electromagnetic transducers 2 and 3 are provided at the air outflow end (trailing edge) TR of either one of, or both rails 11 and 12. The electromagnetic transducers 2 and 3 are provided at the slider 10, with their ends for performing electromagnetic conversion located at positions close to ABSs 13 and 14. At the side surface toward the air outflow end TR, takeout electrodes 27 and 28 connected to the electromagnetic transducers 2 and takeout electrodes 33 and 34 connected to the electromagnetic transducers 3 are provided.

The slider 10 is provided with the ABSs 13 and 14. The ABSs 13 and 14 are respectively constituted of protective films 17 and 18 and slider base body surfaces 15 and 16. The protective films 17 and 18, which are laminated on part of the slider base body surfaces 15 and 16 respectively, cover at least ends of the electromagnetic transducers 2 and 3 including their pole tips. Typical examples of the material to constitute the protective films 17 and 18 include diamond-like carbon (hereafter referred to as DLC), carbon nitride and the like.

The slider 10 in FIG. 1 is provided with rails 11 and 12 at its surface facing opposite the medium, with the slider base body surfaces 15 and 16 constituted of the surfaces of the rails 11 and 12. The number of rails 11 and 12 is not restricted to two. The slider 10 may be provided with one to three rails or it may have a flat surface with no rails. In addition, various geometric patterns shapes may be formed at the surface facing opposite the medium in order to achieve an improvement in the flying characteristics. The present invention may be adopted in the slider 10 of any of the types described above.

In addition, the protective films 17 and 18 are formed linearly in the approximate middle portions of the rails 11 and 12 in the widthwise direction, from the air outflow end TR toward the air inflow end LE. The ends of the electromagnetic transducers 2 and 3 are located at positions receding by a distance corresponding to the film thickness d1 of the protective films 17 and 18.

Figure 3:
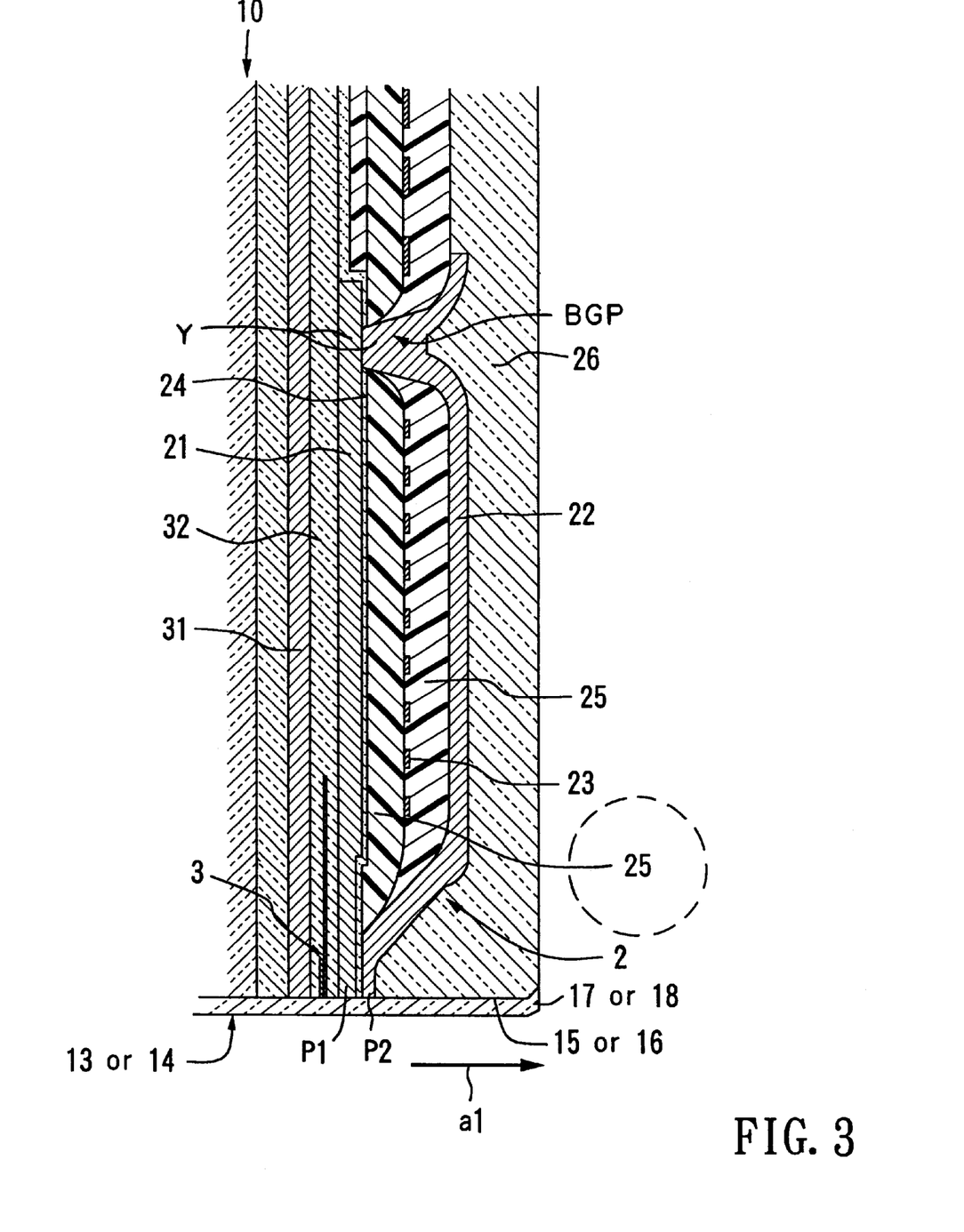
FIG. 3 is an enlarged perspective of an area where electromagnetic transducers are provided in the thin film magnetic head illustrated in FIG. 1.

FIG. 3 is an enlarged perspective of an area where the electromagnetic transducers are provided in the thin film magnetic head illustrated in FIG. 1. The electromagnetic transducer 2 is provided with a first pole tip P1 and a second pole tip P2 emerging at the ABS 13 or 14. The first pole tip P1 and the second pole tip P2 face opposite each other over a gap film 24.

The electromagnetic transducer 2 constituting the write element is provided with a first magnetic film 21 which also functions as a second shield film for the MR element 3, a second magnetic film 22, a coil film 23, a gap film 24 constituted of, for instance, alumina, an insulating film 25 constituted of an organic resin, a protective film 26 constituted of, for instance, alumina, and the like. The front ends of the first magnetic film 21 and the second magnetic film 22 constitute the first pole tip P1 and the second pole tip P2 facing opposite each other over the gap film 24 having a very small thickness, and a write operation is performed at the first pole tip P1 and the second pole tip P2. The yokes of the first magnetic film 21 and the second magnetic film 22 are linked with each other at the back gap portion located on the side opposite from the first pole tip P1 and the second pole tip P2 to complete a magnetic circuit. The coil film 23 is formed on the insulating film 25, winding around the area where the yokes are linked with each other in a coil. The two ends of the coil film 23 are made electrically continuous to the takeout electrodes 27 and 28 (see FIG. 1). The number of turns and the number of layers of the coil film 23 are arbitrary.

The MR element of the electromagnetic transducer 3 may adopt any of the various film structures that have been proposed and put into practical use to date. They include, for instance, those employing an anisotropic magnetoresistive element constituted of Permalloy or the like, a giant magnetoresistive (GMR) film. The present invention may adopt any of those film structures. The MR element of the electromagnetic transducer 3 is provided inside an insulating film 32 between a first shield film 31 and the first magnetic film 21 which also functions as the second shield film. The insulating film 32 may be constituted of, for instance, alumina. The MR element of the electromagnetic transducer 3 is connected to the takeout electrodes 33 and 34 (see FIG. 1).

Figure 4:
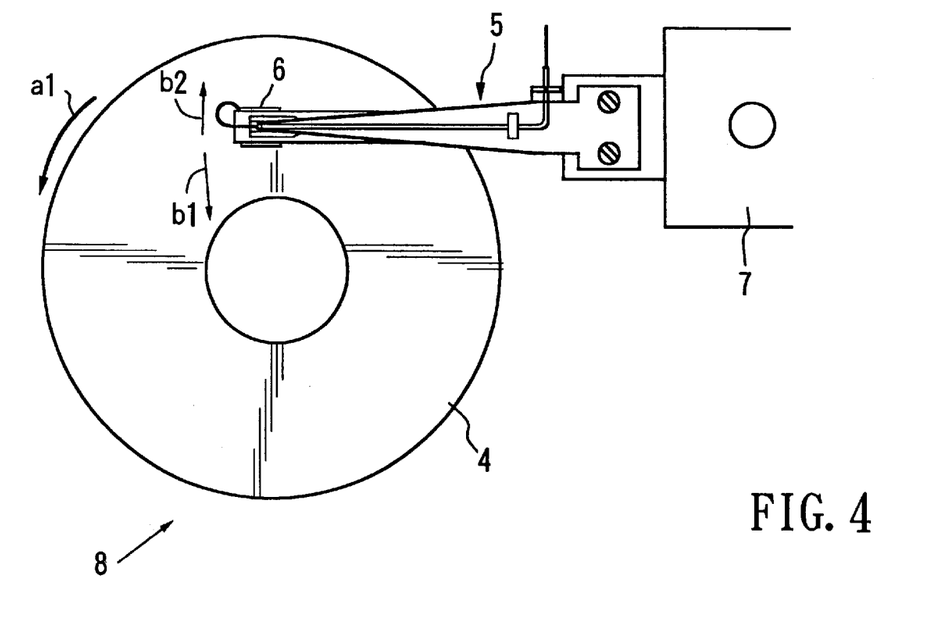
FIG. 4 is a plan view of a magnetic recording/reproduction apparatus mounted with the magnetic head illustrated in FIGS. 1 to 3.

FIG. 4 is a plan view of a magnetic recording/reproduction apparatus 8 mounted with the magnetic head illustrated in FIGS. 1 to 3. The following is an explanation of the magnetic recording/reproduction apparatus shown in FIG. 4, which is given by referring also to FIGS. 1 to 3. A magnetic head 6 according to the present invention is mounted at the front end of a head support device 5. It is driven by adopting the so-called contact start-stop method whereby an operation is started and stopped in a state in which the ABSs 13 and 14 of the slider 10 are placed in spring contact with the surface of a magnetic disk 4.

While the surfaces of the protective films 17 and 18 constituting the ABSs 13 and 14 are pressed against the surface of the magnetic disk 4 due to the spring pressure of the head support device 5 when the magnetic disk 4 is stationary, when the magnetic disk 4 rotates, a lift dynamic pressure is generated at the ABSs 13 and 14 and the magnetic head flies off the surface of the magnetic disk 4 at a flying height that achieves balance between the dynamic pressure and the spring pressure applied by the head support device 5. While the rotary actuator method is normally adopted as the drive method, the linear actuator method may be employed instead. FIG. 4, which illustrates the rotary actuator method, the magnetic head 6 mounted at the front end of the head support device 5 is driven in the direction a1 of a rational radius b1 or b2 of the magnetic disk 4. Then, the magnetic head 6 is positioned at a specific track on the magnetic disk 4 by a position device 7 which drives the head support device 5 so that it can rotate.

In this structure, since the protective films 17 and 18 are laminated on the slider base body surfaces 15 and 16 to constitute the ABSs 13 and 14 respectively in the magnetic head according to the present invention, it is mainly the protective films 17 and 18 that come into contact with the magnetic disk 4, thereby achieving a magnetic head with a high degree of frictional resistance.

In addition, since the protective films 17 and 18 cover at least the ends of the electromagnetic transducers 2 and 3 where the electromagnetic conversion is performed, the electromagnetic transducers 2 and 3 are protected by the protective films 17 and 18. In particular, when the electromagnetic transducers 3 are constituted of MR elements, the ends of the MR elements of the electromagnetic transducer 3 do not come in direct contact with the surface of the magnetic disk 4. Consequently, leakage and discharge of the sense current to the magnetic disk 4 or any defective operation resulting from such leakage and discharge can be prevented with a high degree of reliability.

Furthermore, since the protective films 17 and 18 are laminated on part of the slider base body surfaces 15 and 16 respectively, stages, the height of which is determined by the film thickness d1 of the protective films 17 and 18, are formed around the protective films 17 and 18 relative to the slider base body surfaces 15 and 16. In the figures, the slider base body surfaces 15 and 16 are lower than the surfaces of the protective films 17 and 18. Thus, the ABSs 13 and 14 are constituted by the surfaces of the protective films 17 and 18 and the slider base body surfaces 15 and 16 respectively. Consequently, the force with which the magnetic head 6 adheres to the magnetic disk 4 can be reduced. The force with which the magnetic head 6 adheres to the magnetic disk 4 can be controlled by increasing or decreasing the size of the areas of the protective films 17 and 18.

Moreover, the protective films 17 and 18, which are laminated on part of the slider base body surfaces 15 and 16, are formed to have various patterns. When patterning the protective films 17 and 18, the required pattern can be formed with ease and a high degree of accuracy by providing the protective films 17 and 18 on the slider base body surfaces 15 and 16 and partially removing the protective films 17 and 18 using patterns that are set in advance through a means such as ion milling.

Preferably, the protective films 17 and 18 should be formed to achieve a film thickness d1 within the range of 0.01 to 0.05 $\mu$m (see FIG. 2). If the film thickness d1 of the protective films 17 and 18 exceeds 0.05 $\mu$m, the spacing loss at the electromagnetic transducers 2 and 3 increases to result in a degradation of the electromagnetic conversion characteristics. If, on the other hand, the film thickness d1 is less than 0.01 $\mu$m, the adhesive force can no longer be controlled. Furthermore, when the film thickness d1 of the protective films 17 and 18 is set within the range of 0.01 to 0.05 $\mu$m as described above, the degree of change in the flying characteristics at the ABSs 13 and 14 occurring due to the protective films 17 and 18 can be minimized.

It is desirable that the protective film 17 be formed to satisfy $0.05 \leq (S0-S1)/S0 \leq 0.6$, with S1 representing its area and S0 representing the area of the ABS 13. The area S1 of the protective film 18 should achieve a similar relationship with the area S0 of the ABS 14.

Figure 5:
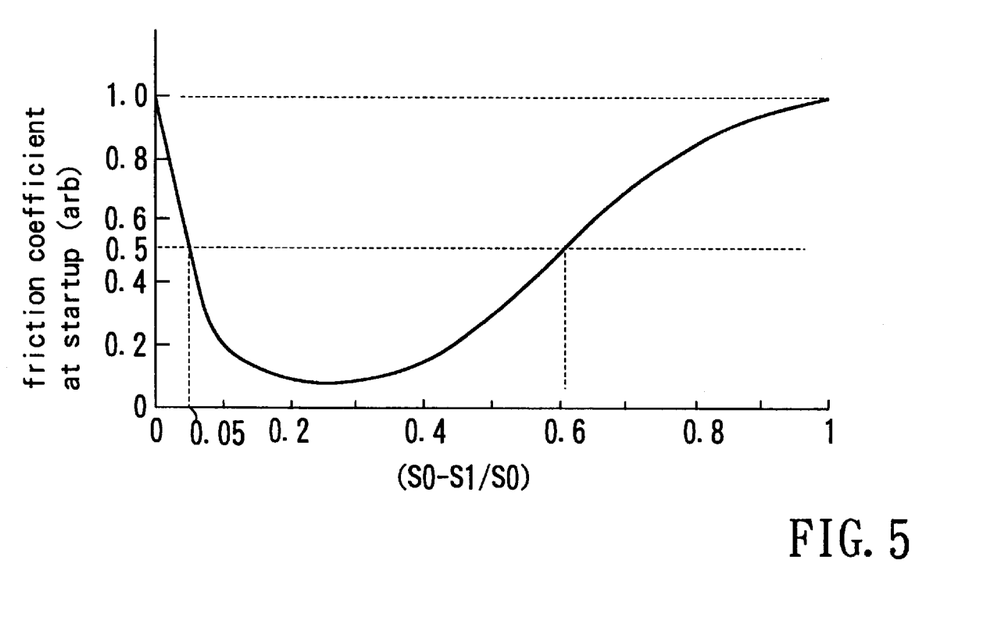
FIG. 5 is a graph, illustrating the relationship between (S0–S1)/S0 and startup frictional resistance.

FIG. 5 presents a graph that illustrates the relationship between $(S0-S1)/S0$ and the startup frictional resistance. The data in FIG. 5 were obtained by adopting the contact start-stop drive method. An arbitrary value representing the startup frictional resistance is achieved by constituting the ABSs 13 and 14 of flat surfaces in which the protective films 17 and 18 and the slider base body surfaces 15 and 16 are not combined. As indicated in the graph, in the magnetic head 6 according to the present invention provided with the protective films 17 and 18, the startup frictional resistance is always smaller than that in a magnetic head in the prior art when it is driven through the contact start-stop method. This means that the adhesive force is reduced. In particular, the startup frictional resistance is equal to or less than 0.5 in a range of $0.05 \leq (S0-S1)/S0 \leq 0.6$, which is half the value achieved by the magnetic head in the prior art.

The shape, the film thickness d1 and the positions of the protective films 17 and 18 and the shape, the positions and the like of the slider base body surfaces 15 and 16 defined by these factors may be varied in correspondence to particular requirements of a given magnetic recording/reproduction apparatus. For instance, in correspondence to the requirements of a specific magnetic recording/reproduction apparatus, a shape or position that will generate a positive pressure or a shape or position that will generate a negative pressure may be adopted, or the film thickness d1 may be selected in correspondence to the rotating speed of the magnetic disk 4. Next, examples of such variations are explained in reference to FIGS. 6 to 8.

Figure 6:
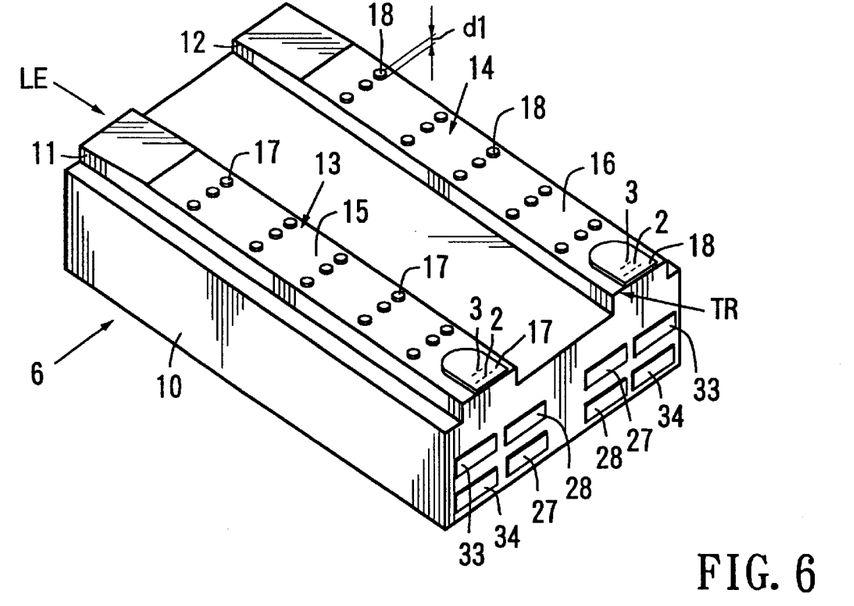
FIG. 6 is a perspective illustrating another example of the magnetic head according to the present invention.

FIG. 6 is a perspective illustrating another example of the magnetic head according to the present invention. In the figure, the same reference numbers are assigned to components identical to those in FIG. 1. This embodiment is characterized in that the protective films 17 and 18 are provided in dots. The individual portions of the protective films 17 and 18 may take any shape such as a circular shape, an elliptical shape, an elongated circle shape, a polygonal shape and the like. In this embodiment, too, the requirements with respect to the thickness d1 of the protective films 17 and 18, the ratio of the area S0 and the area S1 and the like are satisfied.

Figure 7:
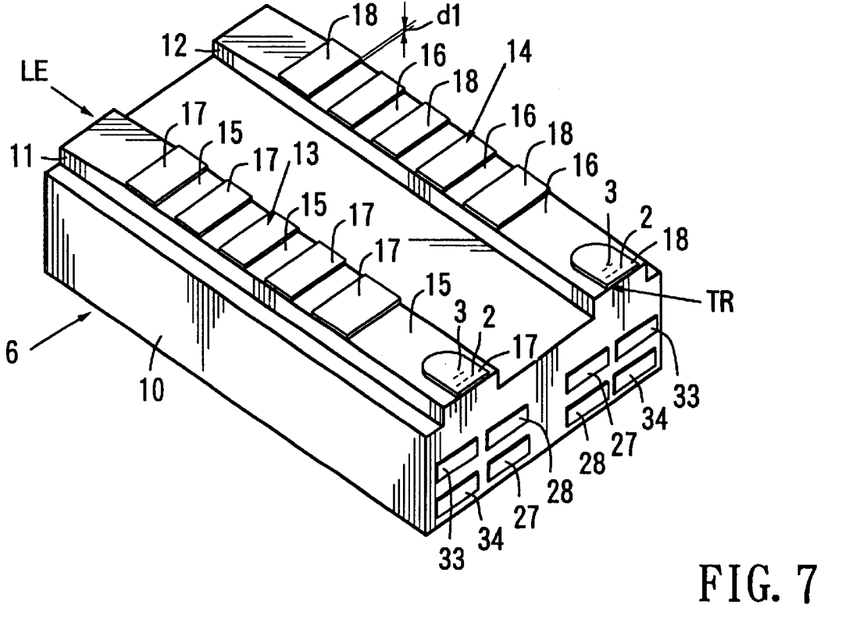
FIG. 7 is a perspective illustrating yet another example of the magnetic head according to the present invention.

FIG. 7 is a perspective illustrating yet another example of the magnetic head according to the present invention. In the figure, the same reference numbers are assigned to components identical to those in FIG. 1. This embodiment is characterized in that the protective films 17 and 18 and the slider base body surfaces 15 and 16 are alternately provided (in stripes) along the direction of the length of the rails 11 and 12. In this embodiment, by setting the film thickness d1 at an appropriate value, the slider base body surfaces 15 and 16 can be made to function as negative pressure generating portions. The requirements with respect to the ratio of the area S0 and the area S1 and the like are satisfied in this embodiment, too.

Figure 8:
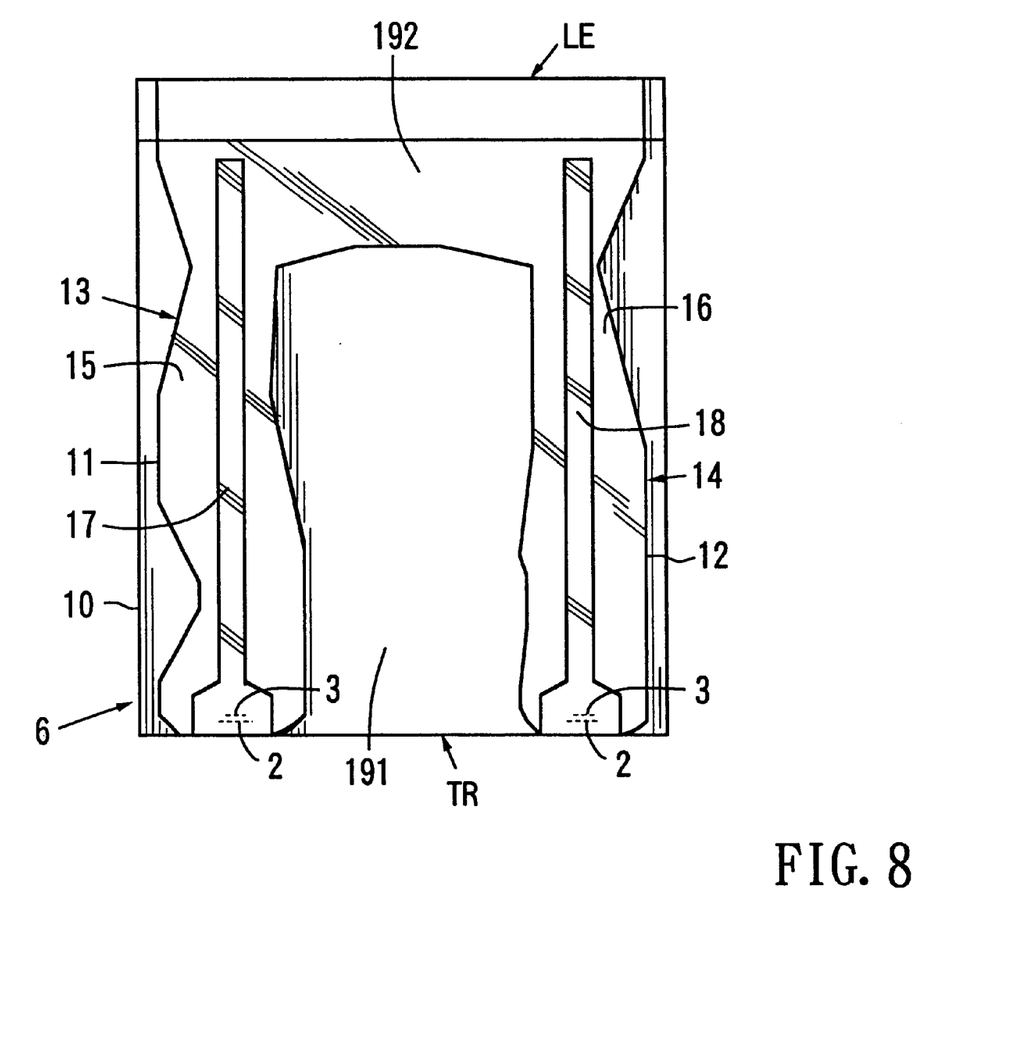
FIG. 8 is a plan view illustrating yet another embodiment of the magnetic head according to the present invention.

FIG. 8 is a plan view illustrating yet another embodiment of the magnetic head according to the present invention. The magnetic head in the figure, which is a negative pressure type, is provided with a protective film 191 to function as a negative pressure generating portion between two projected portions 11 and 12. The area between the projected portions 11 and 12 is closed off by a slider base body surface 192 at the air inflow end (leading edge) LE and is left open at the air outflow end TR. The slider base body surface 192 constitutes a flat surface continuous to the slider base body surfaces 15 and 16. The protective films 17 and 18 are formed in a mode similar to that adopted in the embodiment illustrated in FIGS. 1 and 2. Namely, the protective films 17 and 18 are formed linearly from the air outflow end TR toward the air inflow end LE at approximate middle portions of the slider based bodies 15 and 16 constituting the surfaces of the projected portions 11 and 12 in the widthwise direction. Although not shown, the protective films 17 and 18 15 may also adopt either of the modes illustrated in FIGS. 6 and 7.

In this embodiment, too, the requirements explained earlier with respect to the thickness d1 of the protective films 17 and 18, the ratio of the area S0 and the area S1 and the like are satisfied.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. A magnetic head comprising:
    a slider having an air bearing surface, said air bearing surface including a protective film and a slider base body surface, said protective film being provided intermittently so as to form a pattern of shapes; and
    fist and second electromagnetic transducers provided adjacent to said slider, said first and second electromagnetic transducers each having an end for performing electromagnetic conversion located adjacent to said air bearing surface of said slider so as to be covered by and in contact with said protective film, said protective film being a single layer laminated onto a part of said slider base body surface, said at least one second electromagnetic transducer including a magnetoresistive element, said first electromagnetic transducer including first and second magnetic films having first and second pole tips, respectively, on first ends and first and second yokes, respectively, on second ends, said first and second yokes of said first and second magnetic films, respectively, being linked to each other at a back gap portion of said first electromagnetic transducer, said back gap portion being located opposite of said first and second pole tips of said first and second magnetic films, respectively, of said first electromagnetic transducer at a predetermined distance from said first and second pole tips; and
    adhesion prevention means for preventing adhesion between said magnetic head and a magnetic recording medium over which said magnetic head flies while maintaining a minute distance from said magnetic recording medium as said magnetic recording medium rotates, wherein when S0 represents an area of said air bearing surface and S1 represents an area of said protective film, an equation $0.05 \leq (S0-S1)/S0 \leq 0.6$ is satisfied so that a force with which said magnetic head adheres to said magnetic recording medium can be reduced, said force being controlled by adjusting a size of said area of said protective fin by patterning said protective film so as to form said pattern of shapes.

2. The magnetic head of claim 1, wherein said protective film has a thickness within a range of greater than 0.01 micrometers or $\mu$m (100 Angstroms or Å) to 0.05 micrometers or $\mu$m (500 Angstroms or Å) in order to minimize any changes in flying characteristics of said magnetic head with respect to said magnetic recording medium.

3. The magnetic head of claim 1, wherein said protective film includes a material selected from a group consisting of diamond-like carbon and carbon nitride.

4. The magnetic head of claim 1, wherein said shapes of said pattern of said protective film are selected from a group consisting of circular, elongated circular, elliptical, and polygonal.

5. The magnetic head of claim 4, wherein said pattern of said shapes of said protective film is accomplished easily and with a high degree of accuracy by providing said protective film at said slider base body surface and then partially removing some of said protective film to form said pattern of said shapes which is set in advance through ion milling.

6. The magnetic head of claim 1, further comprising a plurality of takeout electrodes located on an air outflow end of said slider, wherein first and second takeout electrodes of said plurality of takeout electrodes are connected to said first electromagnetic transducer and third and fourth takeout electrodes of said plurality of takeout electrodes are connected to said second electromagnetic transducer.

7. The magnetic head of claim 6 wherein said slider includes a rail on which said protective film of said air bearing surface is mounted.

8. The magnetic head of claim 7, wherein said first and second pole tips of said first and second magnetic films, respectively, of said first electromagnetic transducer are located adjacent to said protective film close to said air bearing surface.

9. The magnetic head of claim 8, further comprising a gap film, wherein said first and second pole tips each have a surface facing opposite of each other in mirror image fashion over said gap film.

10. The magnetic head of claim 9, wherein said first electromagnetic transducer is an inductive electromagnetic transducer constituting a write element, said first electromagnetic transducer including said first and second magnetic films, a coil film, said gap film, a first insulating film, and a second protective film such that front ends of said first and second magnetic films constitute said first and second pole tips, respectively, and a write operation is performed at said first and second pole tips.

11. The magnetic head of claim 10, wherein said coil film is formed within said first insulating film so as to wind around between said first and second pole tips and said yokes of said first and second magnetic films.

12. The magnetic head of claim 11, wherein said coil film has first and second ends which are made electrically continuous to said plurality of takeout electrodes.

13. The magnetic head of claim 12, wherein said second electromagnetic transducer includes said magnetoresistive element such that said first magnetic film of said first electromagnetic transducer functions as a second shield film for said magnetoresistive element.

14. The magnetic head of claim 13, wherein said magnetoresistive element is provided inside of a second insulating film between a first shield film and said first magnetic film functioning as said second shield film for said magnetoresistive element and said magnetoresistive element is connected to said plurality of take out electrodes.

15. The magnetic head of claim 10, wherein said second insulating film, said gap film, and said second protective film are constituted of alumina.

16. The magnetic head of claim 10, wherein said first insulating film is constituted of an organic resin.

17. The magnetic head of claim 1, wherein said second electromagnetic transducer includes said magnetoresistive element, said magnetoresistive element has ends which do not come into direct contact with a surface of said magnetic recording medium on which said magnetic head contacts to prevent any one of leakage and discharge of a sense current from said magnetoresistive element to said magnetic recording medium and defective operations resulting from said leakage and discharge.

18. The magnetic head of claim 17, wherein said protective film is laminated on said slider base body surface so that said slider base body surface is recessed from said protective film so that said force with which said magnetic head is adhered to said magnetic recording medium can be controlled by any one of increasing and decreasing said size of said area of said protective film.

19. A magnetic head comprising:
a slider having an air bearing surface, said air bearing surface including a protective film and a slider base body surface, said protective film being provided intermittently so as to form a pattern of shapes; and
first and second electromagnetic transducers provided adjacent to said slider, said first and second electromagnetic transducers each having an end for performing electromagnetic conversion located adjacent to said air bearing surface of said slider so as to be covered by and in contact with said protective film, said protective film being a single layer laminated onto a part of said slider base body surface, said second electromagnetic transducer including a magnetoresistive element, said magnetoresistive element is provided inside of a second insulating film between a first shield film and a first magnetic film functioning as a second shield film for said magnegnetoresistive element, wherein said magnetoresistive element is connected to a plurality of take out electrodes, wherein said protective film has a thickness within a range of greater than 0.01 micrometers or $\mu$m (100 Angstroms or Å) to 0.05 micrometers of $\mu$ (500 Angstroms or Å), and wherein when S0 represents an area of said air bearing surface and S1 represents an area of said protective film, an equation $0.05 \leq (S0–S1)/S0 \leq 0.6$ is satisfied so that a force with which said magnetic head adheres to said magnetic recording medium can be reduced, said force being controlled by adjusting a size of said area of said protective film by patterning said protective film so as to form said pattern of shapes.

20. A magnetic head comprising:
a slider having an air bearing surface, said air bearing surface including a protective film and a slider base body surface, said protective film being provided intermittently so as to form a pattern of shapes;
first and second electromagnetic transducers provided adjacent to said slider, said first and second electromagnetic transducers each having an end for performing electromagnetic conversion located adjacent to said air bearing surface of said slider so as to be covered by and in contact with said protective film, said protective film being a single layer laminated onto a part of said slider base body surface, said second electromagnetic transducer including a magnetoresistive element, said magnetoresistive element being provided inside of a second insulating film between a first shield film and a first magnetic film functioning as a second shield film, and said magnetoresistive element being connected to a plurality of take out electrodes;
adhesion prevention means for preventing adhesion between said magnetic head and a magnetic recording medium over which said magnetic head flies while maintaining a minute distance from said magnetic recording medium as said magnetic recording medium rotates, wherein when S0 represents an area of said air bearing surface and S1 represents an area of said protective film, an equation $0.05 \leq (S0–S1)/S0 \leq 0.6$ is satisfied so that a force with which said magnetic head adheres to said magnetic recording medium can be reduced, said force being controlled by adjusting a size of said area of said protective film by patterning said protective film so as to form said pattern of said shapes.

21. A magnetic head comprising:
a slider having upper and lower surfaces, left and right side surfaces, and air inflow and air outflow ends, wherein the air inflow and outflow ends have leading and trailing edges, respectively;
first and second rails mounted on said upper surface of said slider;
first and second protective films mounted on an upper surface of each of said first and second rails, respectively, said upper surfaces of said first and second rails constituting first and second slider base body surfaces, respectively, said first slider base body surface together with said first protective film constituting a first air bearing surface, and said second slider base body surface together with said second protective film constituting a second air bearing surface, wherein when S0 represents an area of any one of said first and second air bearing surfaces and S1 represents an area of any one of said first and second protective films, an equation $0.05 \leq (S0 –S1)/S0 \leq 0.6$ is satisfied so that a force with which said magnetic head adheres to said magnetic recording medium can be reduced, said force being controlled by adjusting a size of said area of any one of said first and second protective films by patterning any one of said first and second protective films so as to form a pattern of shapes;
first and second electromagnetic transducers mounted on each of said first and second rails so as to be spaced slightly inwardly of said trailing edge of said slider and so as to be located underneath of and in contact with each of said first and second protective films, wherein each of said first electromagnetic transducers includes:
first and second magnetic films each having fiat ends constituting first and second pole tips, respectively, and second ends constituting first and second yokes, respectively, said first and second yokes contacting each other at a back gap portion located at a predetermined distance from said first and second pole tips.

22. The magnetic head of claim 21, wherein each of said first electromagnetic transducers further includes a gap film located adjacent to said first magnetic film except at said back gap portion where said first and second yokes contact each other, said gap film separating said first and second pole tips which face opposite each other across said gap film.

23. The magnetic head of claim 22, wherein each of said first electromagnetic transducers further includes a first insulating film located between said gap film and said second magnetic film from said first and second pole tips to said back gap portion where said first and second yokes contact each other.

24. The magnetic head of claim 23, wherein each of said first electromagnetic transducers further includes a coil film embedded in said first insulating film.

25. The magnetic head of claim 24, wherein each of said first electromagnetic transducers further includes a third protective film located adjacent to said second magnetic film.

26. The magnetic head of claim 25, wherein each of said second electromagnetic transducers includes a magnetoresistive element embedded in a second insulating film, said second insulating film being located adjacent to said first magnetic film.

27. The magnetic head of claim 26, wherein all of said gap film, said second insulating film, and said third protective film are made of alumina and said gap film has a very small thickness.

28. The magnetic head of claim 23, wherein said first insulating film is made of organic resin.

29. The magnetic head of claim 21, wherein each of said first and second protective films are a single layer having a thickness ranging from greater than 0.01 micrometers or $\mu$m (100 Angstrom or Å) to less than or equal to 0.05 micrometers or $\mu$m (500 Angstrom or Å).

30. The magnetic head of claim 21, wherein said first and second protective films are located along an approximate central longitudinal axis of said first and second rails, respectively, so that said first and second protective films are approximately perpendicular to a central longitudinal axis of said first and second electromagnetic transducers.

31. The magnetic head of claim 30, wherein said pattern of said shapes is selected from a group consisting of circular, elongated circular, elliptical, and polygonal.

32. The magnetic head of claim 21, wherein said first and second rails are mounted on said slider so that a length of each of said first and second rails spans from said air inflow end to said air outflow end of said slider and so that a width of each of said first and second rails is slightly inwardly spaced from said left and right side surfaces, respectively, of said slider.

33. The magnetic head of claim 21, wherein said upper surface of each of said first and second rails has a slightly inclined surface adjacent to said leading edge at said air inflow end of said slider.

34. The magnetic head of claim 21, wherein said first electromagnetic transducer is an inductive electromagnetic transducer and constitutes a write element, and wherein said second electromagnetic transducer constitutes a read element.

35. The magnetic head of claim 21, further comprising a plurality of takeout electrodes located on said air outflow end of said slider, wherein first and second takeout electrodes of said plurality of takeout electrodes are connected to said first electromagnetic transducer and third and fourth takeout electrodes of said plurality of takeout electrodes are connected to said second electromagnetic transducer.

36. The magnetic head of claim 21, wherein said first and second protective films each include a material selected from a group consisting of diamond-like carbon and carbon nitride.

37. The magnetic head of claim 21, wherein each of said first and second protective films are provided linearly.

38. The magnetic head of claim 21, wherein each of said first and second protective films are provided intermittently so as to form a pattern of shapes.

* * * * *

UNITED STATES PATENT AND TRADEMARK OFFICE
CERTIFICATE OF CORRECTION

PATENT NO.    : 6,493,182 B1                                                         Page 1 of 1
DATED         : December 10, 2002
INVENTOR(S)   : Yamanaka et al.

It is certified that error appears in the above-identified patent and that said Letters Patent is hereby corrected as shown below:

<u>Title page,</u>
Item [45] and the Notice information should read as follows:

-- [45] **Date of Patent:  *Dec. 10, 2002**

[*]   Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Sixth Day of May, 2003

JAMES E. ROGAN
*Director of the United States Patent and Trademark Office*